Patented June 24, 1930

1,765,761

UNITED STATES PATENT OFFICE

LOUIS K. FACKLER, OF RIDGEWOOD, NEW JERSEY, ASSIGNOR TO STEIN, HALL & COMPANY, INC., A CORPORATION OF NEW YORK

ADHESIVE AND METHOD OF ITS MANUFACTURE

Application filed December 29, 1927. Serial No. 243,484.

My invention relates to a liquid adhesive for use as sizing, as a substitute for glue, or in fact for any of the similar uses in the arts to which adhesives are applied. The invention comprises an improved method for preparing such adhesive and a new composition for use in carrying out such method. My invention is particularly applicable to those adhesives which include a dextrine as a characteristic constituent and which have the valuable property of being readily soluble in cold water.

The dextrines are generally considered to be readily soluble in water, but owing to the fine subdivision of the particles or other physical properties not completely understood, dextrines tend, when mixed with water, to "ball up" and to form slowly soluble agglomerations. Consequently, in preparing dextrine solutions it has been necessary to introduce the dextrine very gradually into the aqueous solution into which it is intended to be dissolved and to use various agitating means for breaking up the lumps or agglomerated masses which form. Even with these precautions uniformly satisfactory results are not assured. It has also been proposed to increase the solubility and adhesiveness of dextrines by the addition of borax and similar compounds.

The present invention has for an object the preparation in a simple and expeditious manner of a liquid adhesive of substantially uniform consistency free from lumps or agglomerated masses. A further object of the invention is to produce a dextrine composition which can be shipped in dry form to the point where it is to be used and then readily brought into solution with water without resorting to any special or involved technique, thus enabling relatively unskilled persons to convert the adhesive into liquid form for use.

I have found that when certain saline substances are mixed with dextrines in dry form the tendency of such dextrines to agglomerate when mixed with water is overcome. It is my opinion that this is due to the fact that the added substances tend to retard the wetting of the particles of the dextrines, and in a sense slow up the rate of solution of the same, thereby preventing the coalescing or agglomerating of the dextrine particles until the solvent has had an opportunity to permeate the mass so that the dissolving action of the solvent on the dextrine particles will proceed substantially uniformly, both with respect to those particles which may be on the outside of any cohering masses of the dry dextrine and with respect to those particles within such masses which have heretofore been more or less completely excluded from contact with the solvent by reason of the agglomerating action above mentioned. The added substances which have been found suitable are also readily soluble and it is believed that, in addition to restraining or retarding the wetting action of the solvent on the dextrine particles, such substances dissolve more readily than the surrounding dextrine particles and, being intimately admixed with the dextrines, facilitate the permeation of the dextrine mass by the solvent through the paths or spaces created by reason of the solution of the added substances. However, it is to be understood that the invention is not dependent upon the correctness of the theory advanced, which is offered merely as a possible explanation of the improved results obtained.

Substances which have been found to produce the desired results are various soluble sulfates. Among those which have produced especially good results are the soluble sulfates of the alkali and the alkaline-earth metals, for example, the sulfates of sodium, potassium, and magnesium. The proportion of sulfate present in the dry dextrine mixture may be varied over a considerable range depending upon the viscosity and other properties desired in the final liquid adhesive. Ordinarily, when the salt is added to the dextrine composition in proportion of from 3 to 10% by weight of the dry mixture, satisfactory results are insured, although it will be understood that some variation from this range may take place without departing from the scope of the invention.

While not limited thereto, I may start with a dextrine composition prepared as described in my U. S. Patent No. 1,618,150, dated February 15, 1927, and containing sodium perborate or a similar compound having a bleaching action on the dextrine. The sulfate, the perborate and the dextrine, all in the dry state, may be mixed together in one operation or in different mixing operations. Thereafter, when it is desired to use the composition, water is added in sufficient amount to form a sizing or adhesive of the consistency required. Or, if desired, the sulfate and dextrine, after they have been mixed in the dry state and before the dextrine has been mixed with a bleaching agent, may be mixed with water to form a liquid adhesive of the desired consistency. Sodium perborate or an equivalent bleaching agent may then be added to effect the desired bleaching action on the dextrine. The addition of borax to the sulfate-containing dextrine composition, either with or without a perborate addition, is not precluded.

The process may be carried out with the use of either an acid, alkaline or neutral solution, and either at room temperature or under the influence of heat. Also, in place of a dextrine prepared as described in my prior patent above mentioned, any suitable types of dextrines may be used.

It is to be understood that the term "alkaline sulfate" as used in certain of the claims, is intended to include either a sulfate of an alkali metal element or a sulfate of an alkaline earth element.

It is also to be understood that various changes in the details of the procedure outlined and in the preparation of the constituents of the composition may be made without departing from the scope of the invention, which is not to be deemed as limited other than as indicated by the appended claims.

What I claim is:

1. The process of forming a liquid adhesive of substantially uniform consistency which comprises adding to dry dextrine a soluble alkaline sulfate, and adding water thereto to effect the solution of the mixture.

2. The process of forming a liquid adhesive of substantially uniform consistency which comprises adding to dry dextrine sodium sulfate, and adding water thereto to effect the solution of the mixture.

3. A composition of matter for use in forming a liquid adhesive containing dextrine and a soluble alkaline sulfate, both in dry form.

4. A composition of matter for use in forming a liquid adhesive containing dextrine and 3 to 10% of sodium sulfate, both in dry form.

In testimony whereof, I have signed my name to this specification this 24th day of December, 1927.

LOUIS K. FACKLER.